United States Patent [19]
Yamamoto

[11] Patent Number: 5,934,989
[45] Date of Patent: Aug. 10, 1999

[54] AIR CONDITIONING APPARATUS FOR VEHICLE

[75] Inventor: Yoshiyasu Yamamoto, Hazu-gun, Japan

[73] Assignee: Denso Corporation, Kariya, Japan

[21] Appl. No.: 09/026,332

[22] Filed: Feb. 19, 1998

[30] Foreign Application Priority Data

Feb. 20, 1997 [JP] Japan .................................. 9-036447

[51] Int. Cl.[6] ................................................ B60H 3/00
[52] U.S. Cl. ................................................... 454/156
[58] Field of Search ................................ 454/156, 121

[56] References Cited

FOREIGN PATENT DOCUMENTS

| | | | |
|---|---|---|---|
| 2310934 | 9/1974 | Germany | 454/156 |
| 3039148 | 4/1981 | Germany | 454/156 |
| 0209910 | 11/1984 | Japan | 454/156 |
| 0306319 | 6/1971 | U.S.S.R. | 454/156 |

*Primary Examiner*—Harold Joyce
*Assistant Examiner*—Derek S. Boles
*Attorney, Agent, or Firm*—Harness, Dickey & Pierce, PLC

[57] ABSTRACT

An air conditioning apparatus includes an air conditioning unit and a blower unit. An air passage of the air conditioning unit is partitioned into first and second air passages by a partition plate, and an air guiding wall for guiding air blown from the blower unit into the first and second air passages is formed in the air conditioning unit. Further, first and second step portions are provided in the air guiding wall to facilitate a flow of air blown from the blower unit to the first air passage proximate to the blower unit. The fist step portion is formed at a side of the first air passage, and the second step portion is formed on a partition line extending from the partition plate. Thus, air uniformly flows into both the first and second air passages.

8 Claims, 4 Drawing Sheets

FRONT PASSENGER'S SEAT SIDE ← FIRST AIR PASSAGE → ← SECOND AIR PASSAGE → DRIVER'S SEAT SIDE

AIR CONDITIONING APPARATUS FOR VEHICLE

CROSS-REFERENCE TO RELATED APPLICATION

This application is related to and claims priority from Japanese Patent Application No. Hei 9-36447 filed on Feb. 20, 1997, the contents of which are hereby incorporated by reference.

BACKGROUND OF THE INVENTION

1. Field of the Invention

The present invention relates to an air conditioning apparatus for a vehicle, in which air uniformly flows into both first and second air passages of an air conditioning unit when a blower unit is disposed at an offset position relative to the first and second air passages.

2. Description of Related Art

Conventionally, in an air conditioning apparatus for a vehicle, an air conditioning unit has right and left both air passages, and the temperature of air passing through the right air passage and the temperature of air passing through the left air passage are independently controlled. Further, a blower unit for blowing air into the air conditioning unit is disposed at an offset position of the air conditioning unit.

In the conventional air conditioning apparatus, because air blown from the blower unit is vertically bent to be introduced into an inlet portion of the air conditioning unit, uniform distribution of air volume is generated in the right and left two air passages. That is, by a dynamic pressure of air blown from the blower unit, a large amount of air flows into an air passage which is farther from the blower unit between the right and left air passages.

SUMMARY OF THE INTENTION

In view of the foregoing problems, it is an object of the present invention to provide an air conditioning apparatus in which air uniformly flows into both first and second air passages of an air conditioning unit when a blower unit is disposed at an offset position relative to the first and second air passages.

According to the present invention, an air conditioning apparatus includes an air conditioning unit and a blower unit, and an air passage of the air conditioning unit is partitioned into first and second air passages by a partition member. The air conditioning apparatus further includes an air guiding member for guiding air blown from the blower unit into the first air passage and the second air passage, the air guiding member includes a first step portion for facilitating a flow of air blown from the blower unit toward the first air passage proximate to the blower unit, and the first step portion is provided at a position approximately equal to a partition line extending from the partition member. Therefore, air blown from the blower unit smoothly flows into the first air passage proximate to the blower unit. Thus, the first and second air passages have an uniform distribution of air volume.

Preferably, the air guiding member further includes a second step portion, at a side of the first air passage, for further facilitating the flow of air blown from the blower unit toward the first air passage. Therefore, air blown from the blower unit readily uniformly flows into both of the first and second air passages.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

A preferred embodiment of the present invention will be described hereinafter with reference to the accompanying drawings.

Figure 1:
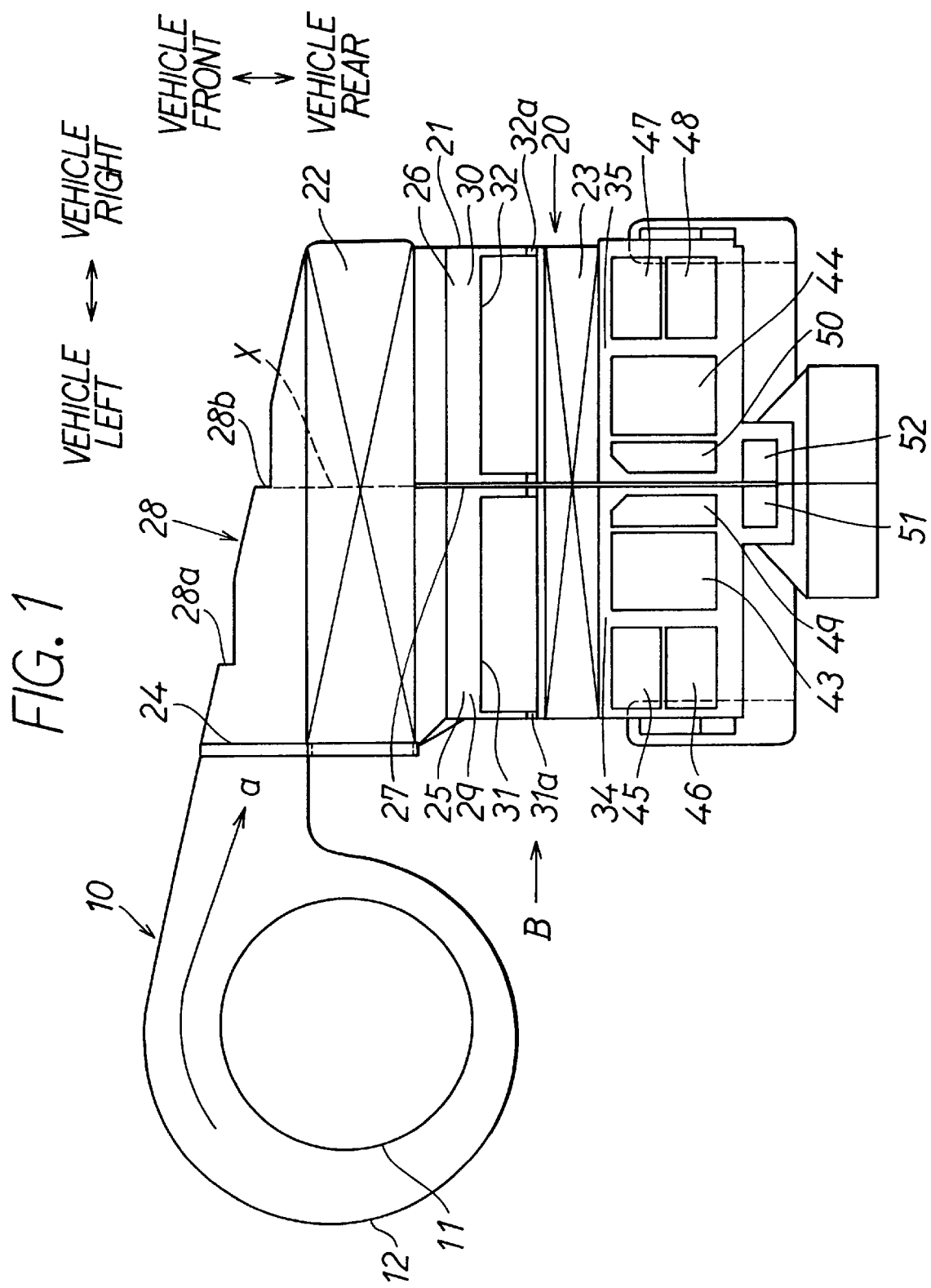
FIG. 1 is a schematic plan view showing a blower unit and an air conditioning unit of an air conditioning apparatus according to a preferred embodiment of the present invention.
Figure 2:
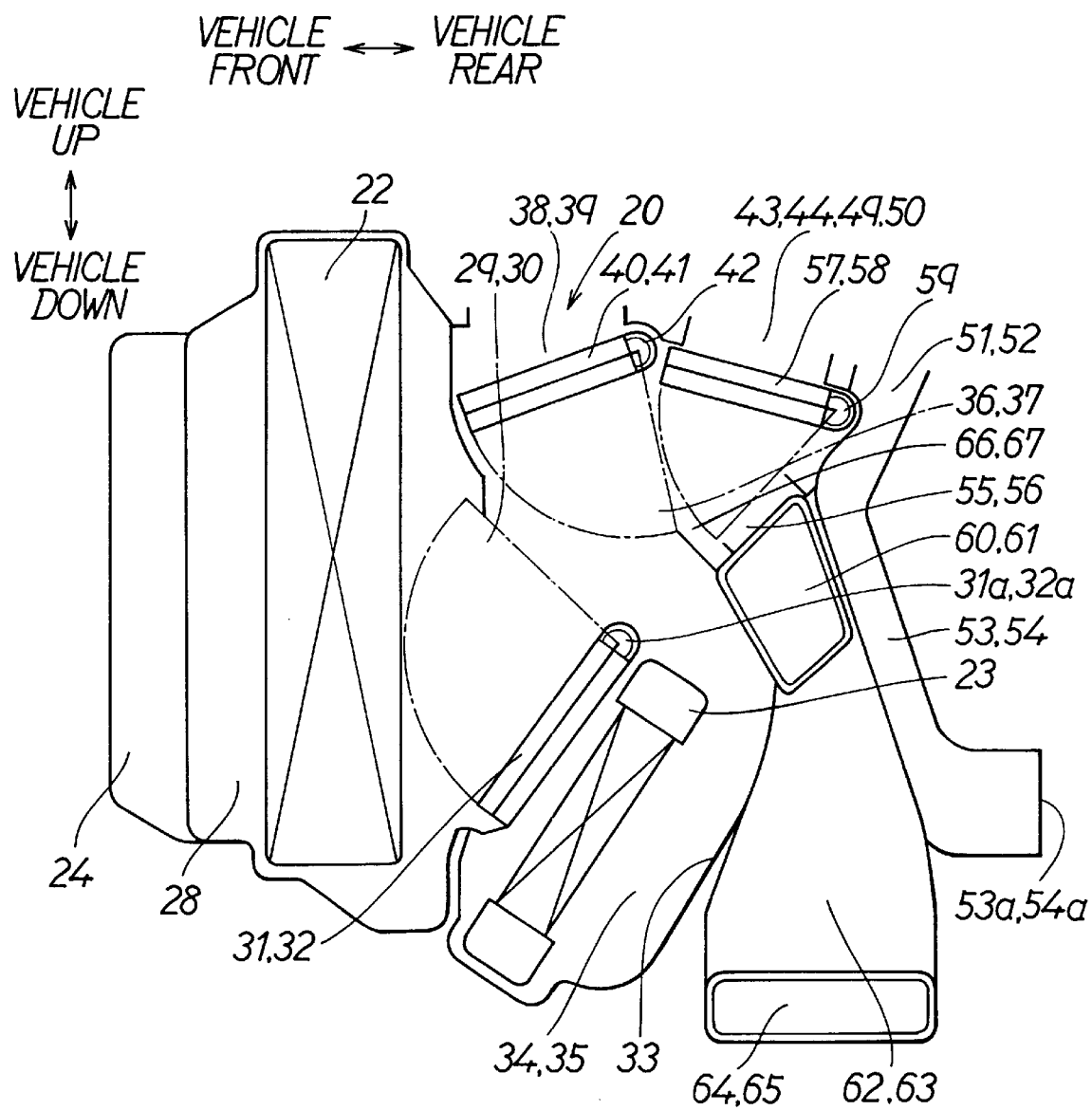
FIG. 2 is a schematic sectional view of the air conditioning unit when viewed from an arrow B in FIG. 1.

As shown in FIGS. 1 and 2, an air conditioning apparatus includes a blower unit 10 and an air conditioning unit 20. The air conditioning unit 20 is disposed under an instrument panel in a passenger compartment at. an approximate center portion in a right-left direction of a vehicle. On the other hand, the blower unit 10 is disposed under the instrument panel in the passenger compartment at an offset position shifted from the center portion to a side of a front passenger's seat (e.g., left side) in the right-left direction of the vehicle.

The blower unit 10 includes a fan composed of a centrifugal multi-blades fan (i.e., sirocco fan). The fan 11 is disposed within a scroll case 12 formed in a spiral shape, and is driven and rotated by an electric motor (not shown). The fan 11 blows air in a direction shown by an arrow a in FIG. 1 along the spiral shape of the scroll case.

The blower unit 10 has an air suction port (not shown) provided at an upper side of the vehicle, and the fan 11 sucks air from the suction port through an inside/outside air switching box (not shown). The inside/outside air switching box has: an inside air intake port for introducing therein inside air (i.e., air inside the passenger compartment); an outside air intake port for introducing therein outside air (i.e., air outside the passenger compartment); and an inside/outside air switching door for opening and closing the inside air intake port and the outside air intake port.

The air conditioning unit 20 includes an air conditioning case 21, an evaporator 22 (i.e., cooling heat exchanger) and a heater core 23 (i.e., heating heat exchanger). The evaporator 22 and the heater core 23 are integrally accommodated within the air conditioning case 21. The air conditioning case 21 is made of resin which has an elasticity to some degree and is superior in a strength, such as ploypropylene, and is composed of two division cases each having an division surface in a vertical direction (i.e., up-down direction of the vehicle) in FIG. 2. The two division cases are integrally connected by fastening means such as a metal spring clip and a screw, after the heat exchangers 22 and 23, and components such as a door (described later) are accommodated therein, to construct the air conditioning case 21.

The air conditioning unit 20 is disposed under the instrument panel in the passenger compartment and at an approximate center portion in the right-left direction of the vehicle. Within the air conditioning case 11, at the most front side of the vehicle, there is formed an air inlet 24 through which air blown from the blower unit 10 flows into the air conditioning unit 20. The air inlet 24 is opened at a side surface of the front passenger's seat to be connected to an air outlet portion of the blower unit 10 disposed in a portion at a front side of the front passenger seat.

Within the air conditioning case 21, the evaporator 22 is disposed at a portion immediately after the air inlet 24 to cross whole areas of air passages in the air conditioning case 21. As shown in FIGS. 1 and 2, the evaporator 22 is thin in the front-rear direction of the vehicle and is disposed in the air conditioning case 21 in such a manner that a longitudinal direction thereof extends in the up-down direction of the vehicle. As being known well, the evaporator 22 is a laminated type in which a plurality of flat tubes, each of which is formed by connecting two metal thin plates made of aluminum or the like to each other, are laminated to sandwich a corrugated fin between adjacent flat tubes, and then integrally brazed.

At an air downstream side (i.e., vehicle rear side) of the evaporator 22, there is adjacently disposed a heater core 23 to form a predetermined distance therebetween. The heater core 23 is for re-heating cool air having passed through the evaporator 22. In the heater core 23, high-temperature cooling water (i.e., hot water) for cooling an engine of the vehicle flows, and the heater core 23 heats the air by using the cooling water as heat source. The heater core 23 is inclined from the up-down direction of the vehicle as shown in FIG. 2. Similar to the evaporator 22, the heater core 23 is a laminated type in which a plurality of flat tubes, each of which is formed by connecting two metal thin plates made of aluminum or the like to each other, are laminated to sandwich a corrugated fin between adjacent flat tubes, and then integrally brazed.

The air conditioning case 21 is formed in such a manner that an air passage within the air conditioning case 21 extends in the front-rear direction of the vehicle. The air passage of the air conditioning case 21 is partitioned in the right-left direction of the vehicle by a partition plate 27 into a first air passage 25 (i.e., left side air passage) and a second air passage 26 (i.e., right side air passage). The first air passage 25 is provided at a position proximate to the blower unit 10, and the second air passage 26 is provided at a position farther from the blower unit 10 as compared with the first air passage 25.

The partition plate 27 is disposed in the front-rear direction of the vehicle to extend from a downstream air end of the evaporator 22 to a downstream air end of the heater core 23 through a peripheral portion of the heater core 23. The partition plate 27 can be integrally formed with the air conditioning case 21. The partition plate 27 has a recess portion at a position where the heater core 23 is disposed.

The heater core 23 is disposed to cross both the air passages 25 and 26. An interior of the heater core 23 is partitioned by a fin surface of the corrugated fin or a flat surface of the flat tube so that the first air passage 25 and the second air passage 26 are partitioned in the heater core 23 at the same position as the partition plate 27 in the right-left direction of the vehicle.

On the other hand, as shown in FIG. 1, an air guiding wall 28 is formed in the air conditioning case 21 at an upstream air side (i.e., front side) of the evaporator 22. The air guiding wall 28 is inclined to rear side of the vehicle. That is, in the embodiment, because the air inlet 24 is provided on the left side surface (i.e., the side of the front passenger's seat ) of the air conditioning unit 20, the air guiding wall 28 is inclined at the rear side of the vehicle. Therefore, an air upstream-side space of the evaporator 22 becomes gradually smaller along the air guiding wall 28 from the left side toward the right side of the vehicle.

In the embodiment, first and second two step portions 28a and 28b extending in the front-right direction of the vehicle are formed in the air guiding wall 28. By providing the two step portions 28a and 28b, a flow of air blown in the right-left direction of the vehicle by the blower unit 10 is readily changed to a flow of air blown in the front-rear direction of the vehicle. Specifically, to facilitate a change of flow direction of air flowing into the first air passage 25 proximate to the blower unit 10, the first step portion 28a is provided at a left side of the air guiding wall 28, and the second step portion 28b is provided at a center portion of the air guiding wall 28 in the right-left direction of the vehicle. In the embodiment, each height of the step portions 28a and 28b is 10 mm, for example.

The second step portion 28b at the center portion of the air guiding wall 28 in the right-left direction of the vehicle is provided on a partition line X of the partition plate 27. That is, the second step portion 28b is placed at the same position as the partition plate 27 in the right-left direction of the vehicle.

Cool air bypass passages 29 and 30 through which cool air having passed through the evaporator 22 bypasses the heater core 23 are respectively formed in the first and second air passages 25 and 26 within the air conditioning case 21 at an upper side of the heater core 23. Further, plate-like air mixing doors 31 and 32 are respectively disposed in the first and second air passages 25 and 26 at a position between the heater core 23 and the evaporator 22. The air mixing doors 31 and 32 are for adjusting a ratio between an amount of warm air passing through the heater core 23 and an amount of cool air bypassing the heater core 23 through the cool air bypass passage 29 and 30.

The air mixing doors 31 and 32 are respectively rotated around rotary shafts 31a and 32a in the up-down direction of the vehicle. By adjusting each opening degree of the air mixing doors 31 and 32, the temperature of air blown from a first air passage 25 and the temperature of air blown from the second air passage 26 can be independently controlled.

The rotary shafts 31a and 32a are rotatably held in the air conditioning case 21 and the partition plate 27. Each one end of the rotary shafts 31a and 32a are respectively protrude outside the air conditioning case 21, and are respectively connected to actuator mechanisms such as servomotors through link mechanisms. By the actuator mechanisms, the rotational positions of the air mixing doors 31 and 32 are independently controlled. The actuator mechanisms are automatically controlled by an electronic control device (not shown) of the air conditioning apparatus.

As shown in FIG. 2, a wall surface 33 extending in the up-down direction of the vehicle is provided within the air conditioning case 21 at a downstream air side of the heater core 23 to form a predetermined distance between the wall surface 33 and the heater core 23. The wall surface 33 is formed integrally with the air conditioning case 21. By providing the wall surface 33, warm air passages 34 and 35 extending upward from an immediately downstream air side of the heater core 23 are respectively formed in the first and second air passages 25 and 26. Further, as shown in FIG. 2, in the first and second air passages 25 and 26, there are respectively formed air mixing spaces 36 and 37 in which warm air passing through the heater core 23 and cool air bypassing the heater core 23 are mixed. That is, the warm air passages 34 and 35 are respectively joined with the cool air bypass passages 29 and 30 in the air mixing spaces 36 and 37.

On the upper surface of the air conditioning case 21, left and right defroster opening portions 38 and 39 are opened at the front side of the vehicle to correspond to the first and second air passages 25 and 26. The defroster opening portions 38 and 39 are connected to a defroster air outlet through a defroster duct (not shown). Therefore, conditioned air from the air mixing spaces 38 and 39 flows into the defroster opening portions 38 and 39, and is blown toward an inner surface of a front windshield of the vehicle from the defroster air outlet.

The defroster opening portions 38 and 39 are respectively opened and closed by defroster doors 40 and 41. The defroster doors 40 and 41 are operatively linked, and are rotated by a single common rotary shaft 42 disposed horizontally at a position proximate to the upper surface of the air conditioning case 21. When each of the defroster doors 40 and 41 is rotated at a chain line position, the defroster opening portions 38 and 39 are fully opened and communication ports 66 and 67 are fully closed. The communication ports 66 and 67 are respectively formed in the first and second air passages 25 and 26. Through the communication ports 66 and 67, conditioned air from the air mixing spaces 36 and 37 is introduced into a side of face opening portions and foot opening portions.

Ten face opening portions 43–52 are provided on the upper surface of the air conditioning case 21 at a rear side (i.e., a passenger's side in the passenger compartment) of the vehicle. As shown in FIG. 1, the face opening portions 43–52 include center face opening portions 43, 44, 49 and 50, and side face opening portions 45–48 provided at right and left two sides of the center face opening portions 43 and 44. Conditioned air from the air mixing spaces 36 and 37 flows into center face opening portions 43, 44, 49 and 50 through the communication ports 66 and 67. The left and right center face opening portions 43 and 44 are connected to a center face air outlet through a face duct. The center face air outlet through which air is blown toward the head portion of a passenger in the passenger compartment is provided at a center upper side on the instrument panel in the right-left direction of the vehicle. The side face opening portions 45–48 are connected to left and right side face air outlets provided on left and right two ends of the instrument panel through a duct. Through the left and right side face air outlets, air is blown toward the head portion of a passenger in the passenger compartment or toward the side windshields of the vehicle. Air-flow plates are disposed in the side face air outlet, and a flow direction of air blown from the side face air outlets can be manually controlled by a passenger in the passenger compartment. That is, by changing the direction of the air flow plates, air can be blown toward the head portion of a passenger seated on a side seat or toward the side windshields.

Further, because the side face opening portions 45–48 are directly communicated with the air mixing spaces 36 and 37, air from the air mixing spaces 36 and 37 can be always blown toward the side face opening portions 45–48 regardless of the operation positions of the defroster doors 40 and 41 and foot/face switching doors 57 and 58.

Rear face opening portions 49 and 50 are provided at the most center portions as shown in FIG. 1. The rear face opening portions 49 and 50 are connected to supplementary rear face opening portions 51 and 52 at the outside of the air conditioning case 21 through ducts, and the supplementary rear face opening portions 51 and 52 are connected to rear face air passages 53 and 54 provided in the air conditioning case 21. Further, a rear face duct (not shown) is connected to opening ends 53a and 54a of the rear face passage 53 and 54, and air is blown from a rear face air outlet provided at a top end of the rear face duct toward the head portion of a passenger seated on a rear seat in the passenger compartment.

Left and right air inlet portions 55 and 56 for foot opening portions are opened into the first and second air passages 25 and 26 at a rear side of the air mixing spaces 36 and 37. The air inlet portions 55 and 56 are provided to oppose to the center face opening portions 43 and 44 and the rear face opening portions 49 and 50, and are opened and closed by foot/face switching doors 57 and 58 disposed respectively in the first and second air passages 25 and 26. The foot/face switching doors 57 and 58 are operatively linked, and are rotated by a single common rotary shaft 59.

Air from the air inlet portions 55 and 56 flows into front opening portions 60 and 61, and is blown out toward the foot area of a passenger seated on a front seat in the passenger compartment through a front foot duct and a front air outlet. Further, a part of air from the air inlet portions 55 and 56 flows through rear foot air passages 62 and 63, and is introduced into rear foot opening portions 64 and 65. Air introduced into the rear foot opening portions 64 and 65 is blown toward the foot area of a passenger seated on a rear seat in the passenger compartment through a rear foot duct and a rear foot are outlet.

The defroster doors 40 and 41 and the foot/face switching doors 57 and 58 are connected to an actuator such as is a servomotor through a link mechanism, and are operatively linked and rotated by the actuator.

Next, an operation of the air conditioning apparatus according to the embodiment will be now described.

The air conditioning apparatus includes the electronic control device provided in an air conditioning operation panel. Operation signals from each operation member disposed in the air conditioning operation panel and sensor signals from each sensor are input to the electronic control device. Based on output signals from the electronic control device, the rotational positions of the air mixing doors 31 and 32 are independently controlled, and the temperature of air blown from the first and second air passages 25 and 26 can be respectively independently controlled.

Further, by switching the operation positions of the defroster doors 40 and 41 and the foot/face switching doors 57 and 58, the following air outlet modes can be set.

(1) FACE AIR OUTLET MODE

In the face air outlet mode, the defroster doors 40 and 41 are operated at the solid line position in FIG. 2 to close the defroster opening portions 38 and 39 and to fully open the communication ports 66 and 67. Further, the foot/face switching doors 57 and 58 are operated at the chain line position in FIG. 2 to close the air inlet portions 55 and 56. Thus, air blown from the blower unit 10 is cooled in the evaporator 22, and the cooled air is mainly blown toward the head portion of the passenger in the passenger compartment through the face opening portions 43, 44, and 49–52. Simultaneously, a part of cool air is blown toward the left and right side portions of the passenger compartment through the side face opening portions 45–48.

(2) BI-LEVEL AIR OUTLET MODE

In the bi-level air outlet mode, the defroster doors 40 and 41 are operated at the solid line position in FIG. 2 to close the defroster opening portions 38 and 39 and to fully open the communication ports 66 and 67. Further, the foot/face switching doors 57 and 58 are operated at an intermediate position between the solid line position and the chain line position in FIG. 2 to open both of the face opening portions 43, 44, 49 and 50 and the air inlet portions 55 and 56. Therefore, air is blown from the blower unit 10 toward both of the head portion and the foot portion of the passenger in the passenger compartment through the face opening portions 43, 44, and 49–52 and the foot opening portions 60, 61, 64 and 65. Simultaneously, a part of blown-air is blown toward the left and right side portions of the passenger compartment through the side face opening portions 45–48.

In the bi-level air outlet mode, each of the air mixing doors 31 and 32 is generally operated at an intermediate position between the solid line and the chain line in FIG. 2. In this state, cool air from the cool air bypass passages 29 and 30 mainly flows into the face opening portions 43, 44, and 49–52 , and warm air from the warm air passages 34 and 35 mainly flows into the foot opening portions 60, 61, 64 and 65. Thus, the temperature of air blown toward the foot opening portions 60, 61, 64 and 65 is higher than the temperature of air blown toward the face opening portions 43, 44, and 49–52, so that a temperature distribution for "cooling head portion and heating foot portion" can be obtained.

(3) FOOT AIR OUTLET MODE

In the foot air outlet mode, each of the foot/face switching doors 57 and 58 is operated at the solid line position in FIG. 2 to close the face opening portions 43, 44, 49 and 50 and to fully open the air inlet portions 55 and 56. On the other hand, the defroster opening portions 38 and 39 are slightly opened with small opening degrees by the defroster doors 40 and 41, and the communication ports 66 and 67 are fully opened. Therefore, air blown from the blower unit 10 is heated by the heater core 23, and then flows into the communication ports 66 and 67. The air flowing into the communication ports 66 and 67 is mainly blown toward the foot portion of the passenger in the passenger compartment through the foot opening portions 61, 61, 64 and 65.

Since the defroster doors 40 and 41 slightly open the defroster opening portions 38 and 39, a ratio between an amount (approximately 20%) of air blown from the defroster opening portions 38 and 39 and the side face opening portions 45–48 and an amount (approximately 80%) of air blown from the foot opening portions 60, 61, 64 and 65 can be preferably set. As a result, warm air can be blown toward the foot area of the passenger in the passenger compartment while defrosting or defogging the windshield.

(4) FOOT/DEFROSTER AIR OUTLET MODE

In the foot/defroster air outlet mode, each of the defroster doors 40 and 41 is rotated in anticlockwise direction from the position in the foot air outlet mode by a predetermined angle, so that both of the defroster opening portions 38 and 39 and the communication ports 66 and 67 are opened with approximate half opening degrees. Therefore, the amount of air blown from the defroster opening portions 38 and 39 and the side face opening portions 45–48 approximately equal to the amount of air blown from the foot opening portions 60, 61, 64 and 65.

(5) DEFROSTER AIR OUTLET MODE

In the defroster air outlet mode, each of the defroster doors 40 and 41 is rotated at the chain line position in FIG. 2 to fully open the defroster opening portions 38 and 39 and to close the communication ports 66 and 67. Therefore, air is not supplied to the face opening portions 43, 44, and 49–52 and the foot opening portions 60, 61, 64 and 65. Thus, air blown from the blower unit 10 mainly flows into the defroster opening portions 38 and 39, and is blown toward the front windshield from the defroster air outlet. Simultaneously, a part of air flowing in the first and second air passages 25 and 26 is blown from the side face opening portions 45–48 toward the side windshields to defrost and defog the windshields of the vehicle.

Next, an uniform distribution of the amount of air flowing in both air passages 25 and 26 will be now described.

As shown in FIG. 1, the air guiding wall 28 is formed in the air conditioning case 21 at the front side of the evaporator 22. The air guiding wall 28 is inclined toward the rear side of the vehicle so that the front side space of the evaporator 22 becomes gradually smaller as going from the left side to the right side of the vehicle. Further, the first and second step portions 28a and 28b are formed in the air guiding wall 28 at midway positions in the right-left direction of the vehicle. Due to the first and second step portions 28a and 28b, the flow direction of air blown from the blower unit 10 in the right-left direction of the vehicle is smoothly changed to the rear side of the vehicle.

Particularly, the first step portion 28a is provided in the air guiding wall 28 at the left side of the vehicle, and the second step portion 28b is provided in the air guiding wall 28 at the center position in the right-left direction of the vehicle on the partition line X of the partition plate 27. Therefore, relative to the first air passage 25 proximate to the blower unit 10, the first and second step portions 28a and 28b facilitate to change the flow direction of air. Thus, it can improve the uniform distribution of the volume of air flowing in both air passages 25 and 26.

Figure 3A:
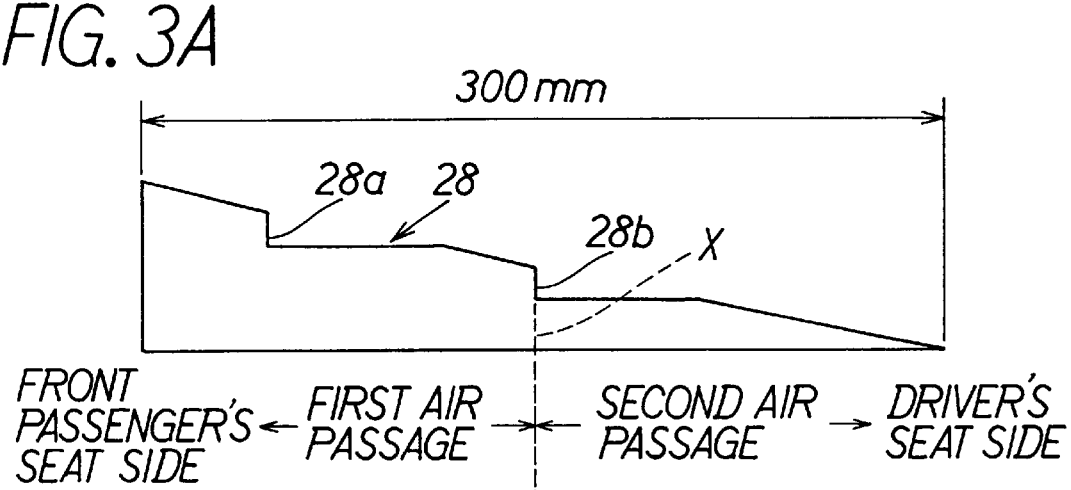
FIG. 3A is a diagrammatic view showing a shape of an air guiding wall in a first air passage and a second air passage according to the embodiment.
Figure 3B:
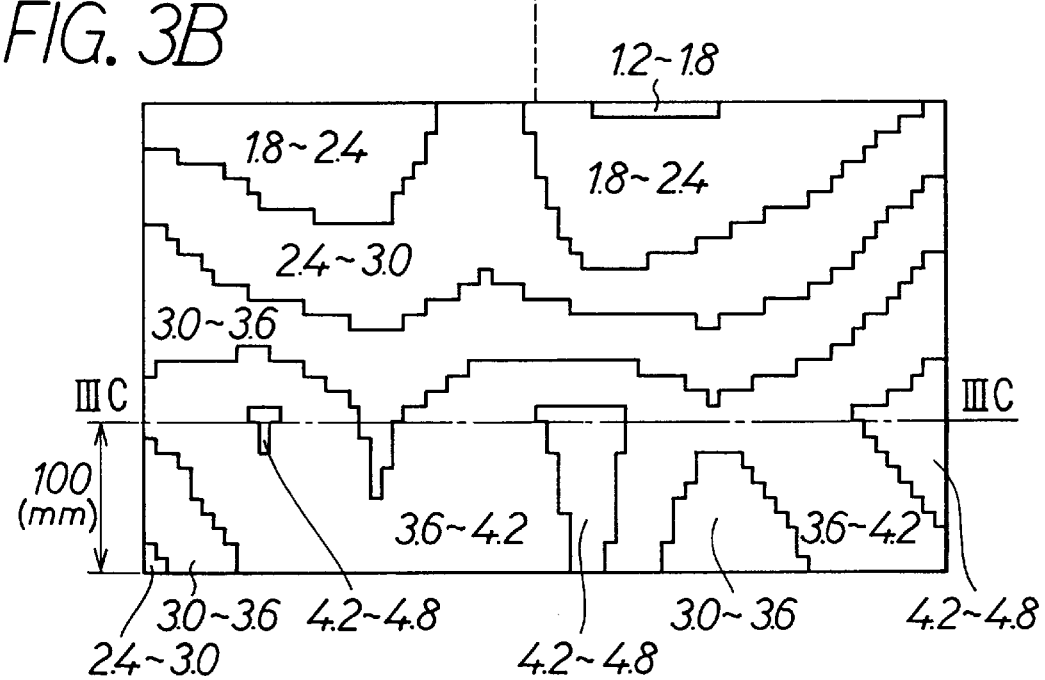
FIG. 3B is a diagrammatic view showing a speed distribution of air blown from the blower unit according to the embodiment.
Figure 3C:
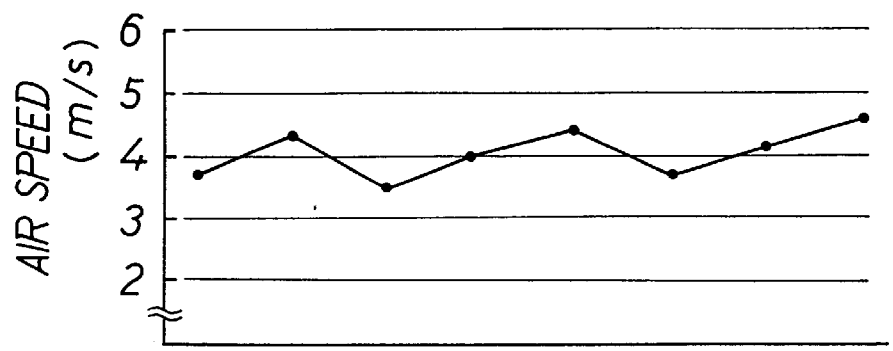
FIG. 3C is a diagrammatic view showing a speed distribution of air in a cross-section of IIIC—IIIC in FIG. 3B.

The effect of the present invention will be now described based on experimental examples. FIG. 3A shows the shape of the air guiding wall 28. As shown in FIG. 3A, the second step portion 28b is placed at the same position as the partition plate 27 in the right-left direction of the vehicle. That is, the second step portion is on the partition line X. In FIG. 3A, the width of the air guiding portion 28 in the right-left direction of the vehicle is approximately 300 mm, and each height of the first and second step portions 28a and 28b is 10 mm. FIG. 3B shows air speed distribution (m/s) on the front area of the evaporator 22 when air is blown from the blower unit 10 disposed at the left side of the vehicle relative to the air conditioning unit 20 having the air guiding wall 28. In FIG. 3B, the up-down direction and right-left direction respectively correspond to the up-down direction and the right-left direction of the vehicle. FIG. 3C shows the air speed distribution (m/s) on the IIIC—IIIC cross-section in FIG. 3B, and the distance between a bottom of the evaporator 22 and the IIIC—IIIC cross-section in the front-rear direction of the vehicle is 100 mm. In FIGS. 3A, 3B and 3C, the face air outlet mode is set, and the volume of air blown from the blower unit 10 is 550 m³/h.

As shown in FIGS. 3B and 3C, air speed difference between the first and second air passages 25 and 26 is smaller than 1 m/s. That is, in the first and second air passages 25 and 26, the air volume is uniformly distributed.

Figure 4A:
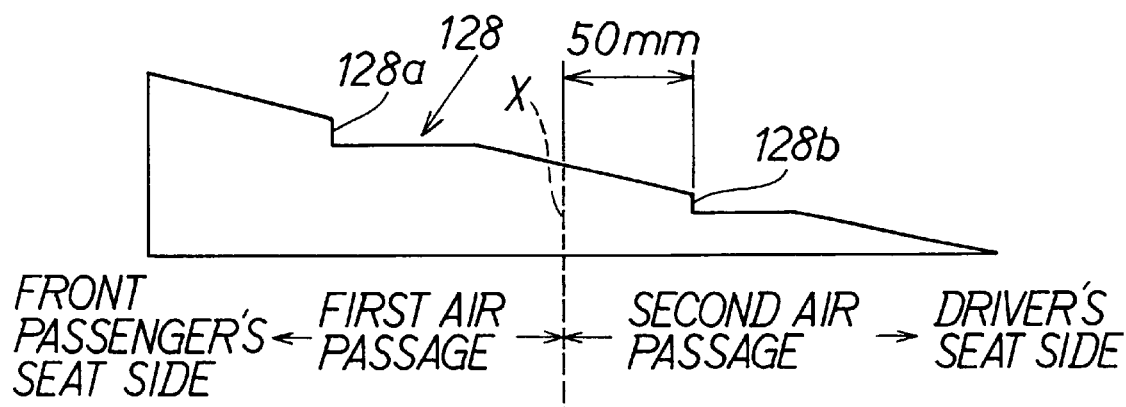
FIG. 4A is a diagrammatic view showing a shape of an air guiding wall for comparison with the embodiment.
Figure 4B:
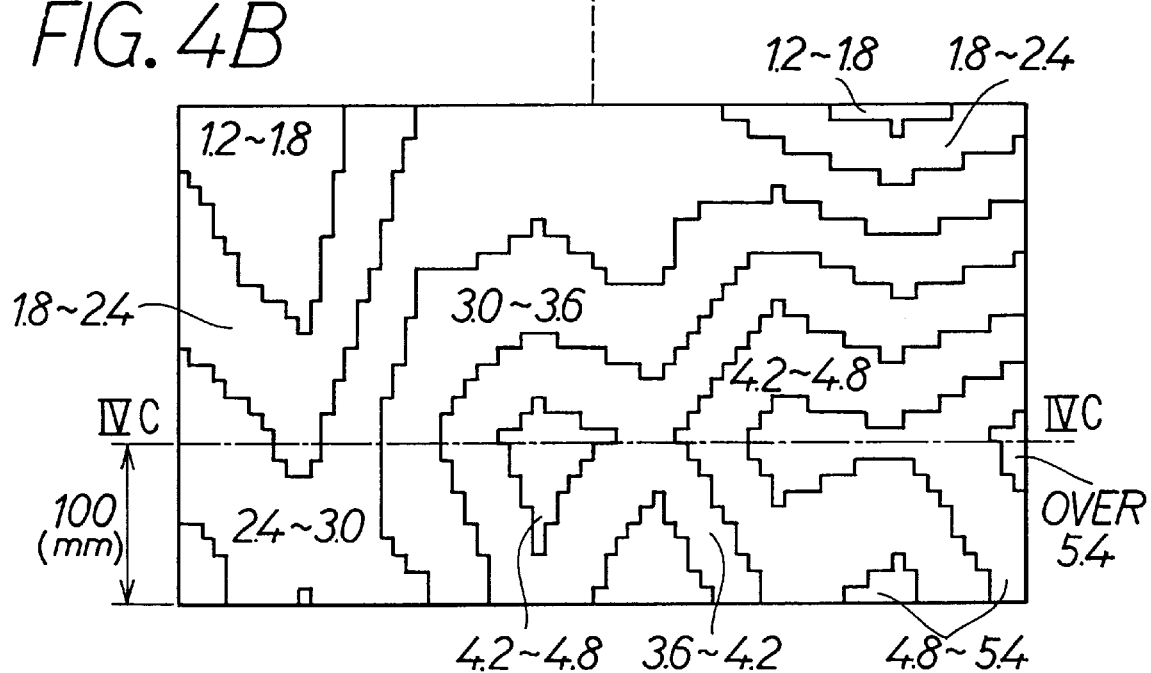
FIG. 4B is a diagrammatic view showing a speed distribution of air blown from a blower unit when using the air guiding wall in FIG. 4A.
Figure 4C:
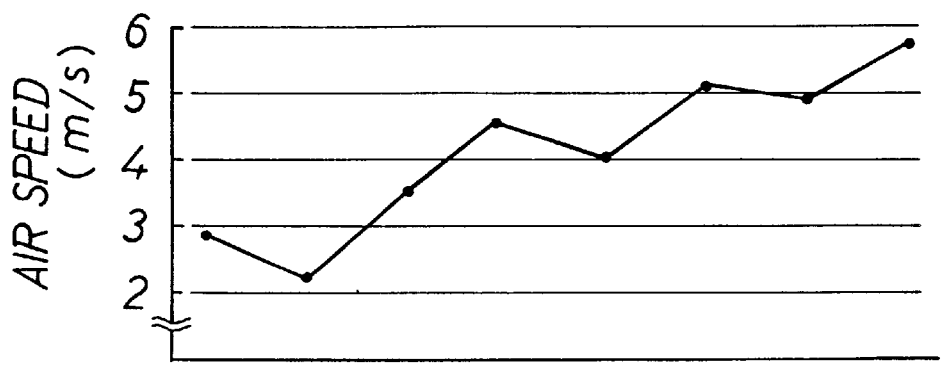
FIG. 4C is a diagrammatic view showing a speed distribution of air in a cross-section of IVC—IVC in FIG. 4B.

The inventors perform a comparatione experiment as shown in FIGS. 4A, 4B and 4C. In the comparatione experiment, an air guiding wall 128 includes a first step portion 128a at the same position as the first step portion 28a in the embodiment, and a second step portion 128b. The second step portion 128b is shifted from the partition line X of the partition plate 27 at the right side, and the distance between the partition line X and the second step portion 128b in the right-left direction of the vehicle is 50 mm. The other conditions of the comparatione experiment are similar to that of the first embodiment. FIGS. 4A, 4B and 4C respectively correspond to FIGS. 3A, 3B and 3C. As shown in FIGS. 4B and 4C, air speed difference between the first and second air passages 25 and 26 is larger than 3 m/s. That is, in the comparatione experiment, the first and second air passages 25 and 26 have ununiform distribution.

Although the present invention has been fully described in connection with the preferred embodiment thereof with reference to the accompanying drawings, it is to be noted that various changes and modifications will become apparent to those skilled in the art.

For example, in the above-described embodiment, the second step portion 28b is provided on the partition line X of the partition plate 27. However, the second step portion 28b may be slightly shifted from the partition line X (e.g., several mm) in the right-left direction of the vehicle. When the second step portion 28b is slightly shifted from the partition line X (e.g., the shifted amount is several mm), an operation effect approximately similar to the above-described embodiment can be provided.

In the above-described embodiment, the air mixing doors 31 and 32 are used to independently adjust the amount of air passing through the heater core 23 and bypassing the heater core 23 in the first and second air passages 25 and 26. However, in the first and second air passages 25 and 26, both heater cores 23 may be respectively provided, and both hot water valves for adjusting the temperature or the amount of hot water circulating each heater core 23 may be respectively provided.

Further, in the above-described embodiment, the present invention is applied to the air conditioning apparatus in which the temperature of air blown into the right side and the temperature of air blown into the left side of the passenger compartment are respectively independently controlled. However, the present invention may be applied to an air conditioning apparatus in which the blower unit is disposed at a side portion (i.e., offset position) of the air conditioning unit 20 so that an ununiform distribution of air volume is generated in the first and second air passages 25 and 26.

Such changes and modifications are to be understood as being within the scope of the present invention as defined by the appended claims.

What is claimed is:

1. An air conditioning apparatus for a vehicle having a passenger compartment, said air conditioning apparatus comprising:
   an air conditioning unit for adjusting a temperature of air to be blown into the passenger compartment, said air conditioning unit including an air conditioning case for forming an air passage;
   a partition member for partitioning said air passage into a first air passage and a second air passage;
   a blower unit for blowing air into said first air passage and said second air passage, said blower unit being disposed at a side portion of said air conditioning unit to be proximate to said first air passage; and
   an air guiding member, disposed in said air conditioning case, for guiding air blown from said blower unit into said first air passage and second air passage, wherein:
      said air guiding member includes a first step portion for facilitating a flow of air blown from said blower unit toward said first air passage; and
      said first step portion is provided at a position approximately equal to a partition line extending from said partition member.

2. The air conditioning apparatus according to claim 1, wherein said air guiding member further includes a second step portion, at a side of said first air passage, for facilitating the flow of air blown from said blower unit toward said first air passage.

3. The air conditioning apparatus according to claim 1, wherein said air guiding member is a guiding wall integrated with said air conditioning case.

4. The air conditioning apparatus according to claim 2, wherein said first step portion and said second step portion are disposed to increase a volume of air to be blown into said first air passage.

5. The air conditioning apparatus according to claim 1, wherein said first step portion is on the partition line of said partition member.

6. The air conditioning apparatus according to claim 2, wherein each of said first step portion and said second step portion has a stepwise shape.

7. The air conditioning apparatus according to claim 1, wherein:
   said air conditioning unit includes
      a heat exchanger which performs heat exchange with air flowing through said first air passage and said second air passage, and
      a temperature adjustment unit for independently control a temperature of air flowing through said first air passage and a temperature of air flowing through said second air passage.

8. The air conditioning apparatus according to claim 7, wherein:
   said air conditioning unit is disposed at a front side of the passenger compartment at an approximate center portion in a right-left direction of the vehicle;
   said blower unit is disposed at a side position of said air conditioning unit to be shifted from said air conditioning unit in the right-left direction of the vehicle; and
   said partition member is disposed in such a manner that said first and second air passages are partitioned in the right-left direction of the vehicle, and air flows through said first and second air passages from a front side to a rear side of the vehicle.

* * * * *